(12) United States Patent
Longo

(10) Patent No.: US 6,983,575 B2
(45) Date of Patent: Jan. 10, 2006

(54) SELF-ABSORBING GAS-BARRIER RECEPTACLE FOR FOOD PACKAGING AND FOOD PACKAGE OBTAINED THEREFROM

(75) Inventor: Eugenio Longo, Rho (IT)

(73) Assignee: Cryovac, Inc., Duncan, SC (US)

( * ) Notice: Subject to any disclaimer, the term of this patent is extended or adjusted under 35 U.S.C. 154(b) by 0 days.

(21) Appl. No.: 10/483,583

(22) PCT Filed: Jul. 4, 2002

(86) PCT No.: PCT/EP02/07464

§ 371 (c)(1),
(2), (4) Date: Jan. 9, 2004

(87) PCT Pub. No.: WO03/066337

PCT Pub. Date: Jun. 23, 2003

(65) Prior Publication Data

US 2004/0163973 A1 Aug. 26, 2004

(30) Foreign Application Priority Data

Jul. 12, 2001 (EP) .................................. 01116999

(51) Int. Cl.
*B65B 31/02* (2006.01)
(52) U.S. Cl. ............................ 53/432; 53/478; 206/204
(58) Field of Classification Search .................. 53/431, 53/432, 478; 206/204, 205; 220/62.11
See application file for complete search history.

(56) References Cited

U.S. PATENT DOCUMENTS

| | | | |
|---|---|---|---|
| 3,209,978 A * | 10/1965 | Dupuis | 206/204 |
| 3,360,382 A * | 12/1967 | Miller | 53/432 |
| 3,834,606 A * | 9/1974 | Andersson | 206/204 |
| 4,321,997 A * | 3/1982 | Miller | 206/204 |
| 4,382,507 A * | 5/1983 | Miller | 206/204 |
| 4,702,377 A | 10/1987 | Grone | |
| 4,860,887 A * | 8/1989 | Fosse | 206/204 |
| 5,045,369 A * | 9/1991 | Kobayashi et al. | 220/62.11 |
| 5,135,787 A * | 8/1992 | Bair | 206/204 |
| 6,216,855 B1 * | 4/2001 | Grone | 206/204 |
| 6,482,452 B1 * | 11/2002 | Weller et al. | 206/204 |

(Continued)

FOREIGN PATENT DOCUMENTS

EP 520509 * 12/1992

(Continued)

*Primary Examiner*—Louis Huynh
(74) *Attorney, Agent, or Firm*—Daniel B. Ruble

(57) ABSTRACT

A receptacle (110, 112) suitable for food packaging which comprises a bottom or base portion (111, 121) defining a storage compartment or zone and a flange (113,123) circumferentially extending all around the receptacle contour providing an area for the closing lid to be sealed, said receptacle being made of a multi-layer thermoplastic structure comprising at least i) an upper liquid absorbent layer (1) that is devised to be either in direct contact with the food product to be packaged in the receptacle or separated therefrom by one or more liquid pervious layers (5,6) allowing passage of liquids from the receptacle inner surface into the absorbent layer, and ii) a non-perforated liquid and gas-barrier thermoplastic film (2), and being characterized in that the surface exposed along a closed line in the circumferential flange (113,123) is of the lower non-perforated liquid and gas-barrier thermoplastic film (2). By sealing a liquid- and gas-barrier lid to the exposed surface of the liquid- and gas-barrier film of the receptacle along said closed line in the circumferential flange, it is then possible to obtain a self-absorbing, gas-barrier, package.

26 Claims, 7 Drawing Sheets

U.S. PATENT DOCUMENTS 6,579,595 B2 * 6/2003 Lemaire ..................... 206/204

FOREIGN PATENT DOCUMENTS

| EP | 642907 B1 | * | 3/1995 |
| EP | 0 690 013 A1 | | 1/1996 |
| EP | 878481 | * | 11/1998 |
| EP | 965426 | * | 12/1999 |
| EP | 1 211 193 A1 | | 6/2002 |
| GB | 2322100 | * | 8/1998 |
| WO | WO 98/12126 | * | 3/1998 |
| WO | WO 99/32286 | * | 7/1999 |
| WO | WO 00/46125 | * | 8/2000 |

* cited by examiner

SELF-ABSORBING GAS-BARRIER RECEPTACLE FOR FOOD PACKAGING AND FOOD PACKAGE OBTAINED THEREFROM

This application is a U.S. National stage filed under 35 U.S.C. 371 of an international application Ser. No. PCT/EP02/07464 filed Jul. 4, 2002; which claims priority from EPO 01116999.2 filed Jul. 12, 2001.

The present invention relates to a receptacle for food packaging suitable for use in vacuum or modified atmosphere packaging of food products that tend to exude fluids.

The present invention is also directed to the use of said receptacles in food packaging processes and to the food packages obtained thereby.

BACKGROUND OF THE INVENTION

It is conventional practice to display meat, poultry, and other food products in individual packages which comprise a supporting tray with an absorbent pad placed between the upper surface of the tray and the food product, to absorb any juices or liquids, such as blood, exuded from the food product. To prevent or retard any migration of the liquids from the absorbent pad back to the food product, the absorbent pads are typically enveloped in a moisture impermeable film that has a number of perforations on the surface facing the tray.

The use of an absorbing pad suffers from the big disadvantage of the labor cost involved in inserting it into a tray, including the costs of a padding machine specifically designed for this purpose. Another disadvantage of this system is the aesthetics of the pad when filled with liquids, particularly blood. Still another disadvantage can be experienced when the pad is saturated with the liquids, as it then tends to stick to the food product and must be physically separated therefrom by the consumer after the package is opened.

One approach to solve the above problems has been to provide a packaging tray having integral means for removing the fluids exuded from the food products, without requiring the use of a separate pad.

Several patents and patent applications have thus been published describing receptacles for packaging food products exuding fluids made with a laminate wherein an absorbing layer is positioned on top of a support layer or between a support layer and a food-contact perforated layer. Examples of these receptacles are described in GB-A-2,322,100, WO-A-99/32286, EP-A-878,481, EP-A-965,426, EP-A-642,907, and WO-A-98/12126.

None of these documents however makes reference to the possibility of obtaining a self-absorbing tray (i.e. a tray with integral means capable of absorbing the fluids) having gas-barrier properties.

On the other hand gas-barrier properties for a packaging material have become extremely important. By using gas-barrier packaging material, it is in fact possible to package the food product under a modified atmosphere especially designed to increase the shelf life of the packaged product. It is thus possible for instance to prepare suitable food packages, e.g. meat packages, at a central unit and then distributing them to supermarkets and small shops.

EP-B-520,509 relates to a thermoformed self-absorbing packaging element with gas-barrier properties. What is described in EP-A-520,509 is a container comprising an absorbing layer positioned between a substrate layer and an inner, food-contact porous drainage layer wherein gas barrier properties are provided by an outermost layer of a gas-barrier material.

Following the teaching of EP-A-520,509 it is however not always possible to obtain the claimed gas-barrier properties. On the contrary, in most of the cases and independently on the gas-barrier properties of the outer gas-barrier layer and of the gas-barrier film that closes the mouth of the tray, the atmosphere within a package obtained by following the teaching of EP-A-520,509 does equilibrate with the outer atmosphere in a very short time. In fact when a foamed or a fibrous layer is employed in the construction of the tray, gases can permeate through the lateral edges of said foamed or fibrous gas-permeable layer and easily move within said layer through the walls of the container, passing through the porous drainage layer.

More particularly when a foam layer, such as a polystyrene foam layer, is employed as the substrate structural layer, even if an outer layer and a lid with a very low OTR are employed, the atmosphere within the package re-equilibrates with the outer atmosphere in just few hours. In such a case it is almost immaterial whether the heat-sealing of the lid to the tray rim is carried out by using conventional pressure conditions or a much higher pressure, as in any case the foamed cells with not be compressed to such an extent to exclude air permeation at the sealing area.

Also when a rigid layer is employed as the substrate structural layer but the absorbing layer is obtained, as indicated in EP-A-520,509, by a formulation of expanded and/or fibrous material, then in most of the cases air may pass through the side edges of such a highly gas permeable absorbing layer entering into the end package.

WO 00/46125 describes a self-absorbing food-packaging tray that comprises a "space" sealed in a fluid-tight manner and filled by a material from which the wall structure is made. The sealed space is obtained by bringing together the outer surface and the inner surface of the base wall. According to WO 00/46125 this can be obtained either by solvent or paint coating the distal edges of the tray rim to bridge the inner and the outer surfaces across the thickness of the wall structure at said peripheral edge (and in this case the sealed space and the tray would be conterminous) or by bringing together the inner and the lower surfaces by an ultrasonic seal or by the application of heat and pressure in a conventional thermoforming step. In certain instances, depending on the type of inner liners employed and/or of the way the tray is lidded, a gas-barrier package might be obtained.

No details are given in WO 00/46125 on how the ultrasonic sealing or the thermoforming steps must be performed to achieve sealing of the outer surface to the inner one with "disappearance" of the porous layer in-between at the sealing area. If sufficiently high pressures are exerted to fracture the intermediate porous layer and allow sealing of the inner surface to the outer one, the risk of cracking of the structure in the area closed to said seal and therefore the risk of leakers would probably be high.

Also difficult in the system of WO 00/46125 would be to guarantee consistent results in industrial conditions. Finally, with reference to what appears to be a preferred embodiment for the manufacture of a gas-barrier tray, where the structure comprises two gas-barrier liners, one on the outer surface and the other on the inner surface, recyclability of the skeleton would be impaired and the costs of the final product remarkably increased.

Thus, although WO 00/46125 describes a gas-barrier package using self-absorbing barrier foam tray, room for improvement exists in pursuit of a gas-barrier package based on a self-absorbing foam tray.

It is therefore an object of the present invention to provide a receptacle for food packaging which is capable of absorbing fluids exuded from the food product placed thereon without requiring the use of a separate pad and that at the same time may guarantee that the end package obtained by sealing to the receptacle flange a gas-barrier film will have gas-barrier properties.

SUMMARY OF THE PRESENT INVENTION

In a first aspect the present invention is directed to a receptacle suitable for food packaging which comprises a bottom or base portion defining a storage compartment or zone and a flange circumferentially extending all around the receptacle contour providing an area for the closing lid to be sealed, said receptacle being made of a multi-layer thermoplastic structure comprising at least (i) an upper liquid absorbent layer that is devised to be either in direct contact with the food product to be packaged in the receptacle or separated therefrom by one or more liquid pervious layers allowing passage of liquids from the receptacle inner surface into the absorbent layer, and (ii) a lower non-perforated liquid and gas-barrier thermoplastic film, characterized in that the surface exposed along a closed line in the circumferential flange is of the lower non-perforated liquid and gas-barrier thermoplastic film.

The terms "upper" and "lower" as used herein refer to the relative positioning of the layers concerned in the overall multi-layer structure, wherein "upper" means closer to the product to be packaged and "lower" means further from the food product to be packaged.

In a second aspect the present invention is related to a method of packaging a food product that tends to exude fluids, by loading it into the storage compartment of the receptacle of the invention, optionally vacuumizing and/or gas flushing the receptacle with a suitably selected gas or gas mixture that would extend the shelf life of the packaged product and closing said receptacle by means of a gas-barrier lid sealed to the exposed surface of the liquid- and gas-barrier film along a closed line in the circumferential flange of the receptacle.

In a third aspect the present invention is directed to a gas-barrier package for food products that tends to exude fluids comprising a food product loaded onto or into a receptacle according to the present invention closed by a gas-barrier lid, disposed over the food product, and sealed to the exposed surface of the liquid- and gas-barrier film along a closed line in the circumferential flange of the receptacle.

DETAILED DESCRIPTION OF THE INVENTION

In a first aspect the present invention is directed to a receptacle suitable for food packaging which comprises a bottom or base portion defining a storage compartment or zone and a flange circumferentially extending all around the receptacle contour providing an area for the closing lid to be sealed, said receptacle being made of a multi-layer thermoplastic structure comprising at least i) an upper liquid absorbent layer that is devised to be either in direct contact with the food product to be packaged in the receptacle or separated therefrom by one or more liquid pervious layers allowing passage of liquids from the receptacle inner surface into the absorbent layer, and ii) a non-perforated liquid and gas-barrier thermoplastic film, and being characterized in that the surface exposed along a closed line in the circumferential flange is of the lower non-perforated liquid and gas-barrier thermoplastic film.

Figure 1:
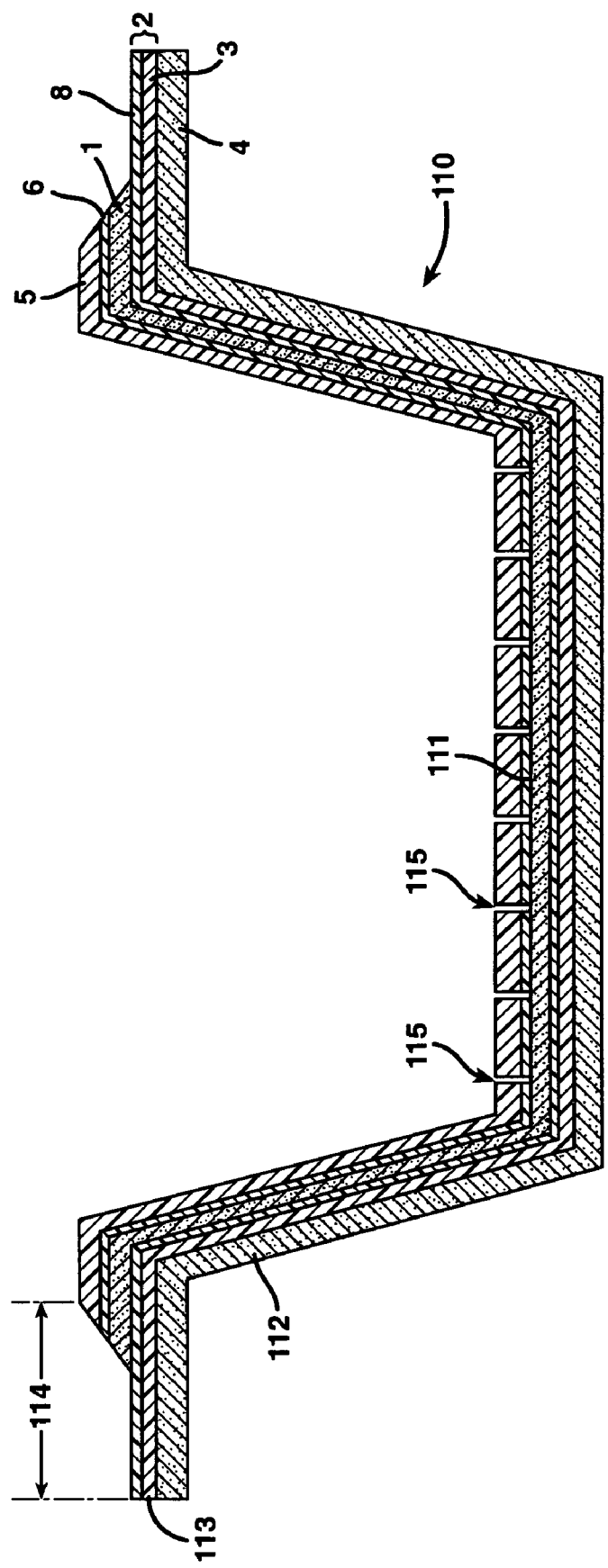
FIG. 1 is a sectional view of a first preferred embodiment of the receptacle of the present invention.
Figure 2:
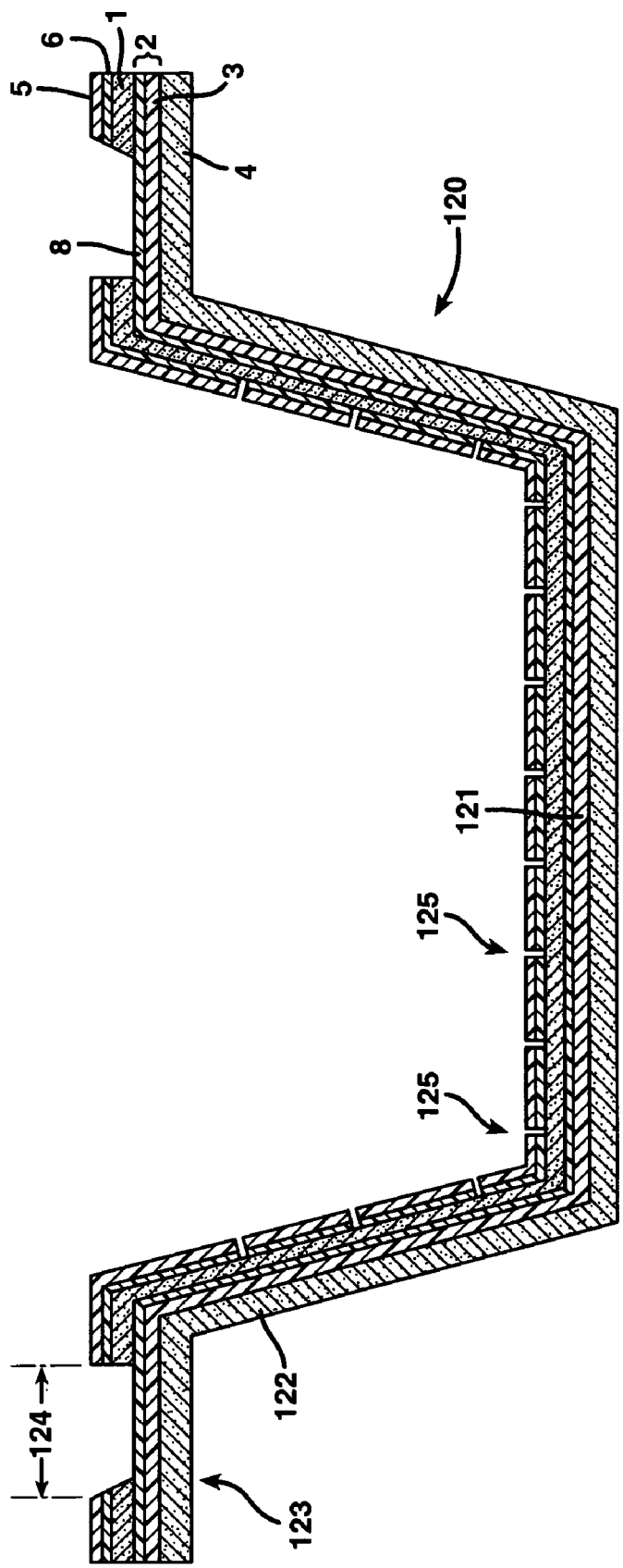
FIG. 2 is a sectional view of a second preferred embodiment of the receptacle of the present invention.

In a preferred embodiment the receptacle has the shape of a tray, comprising a bottom portion and side walls integral with said bottom and with each other defining a storage compartment, and the flange extends outwardly from the top edges of the side walls, typically in a plane substantially parallel to that of the bottom portion. Said embodiment is illustrated in FIGS. 1 and 2.

Figure 3:
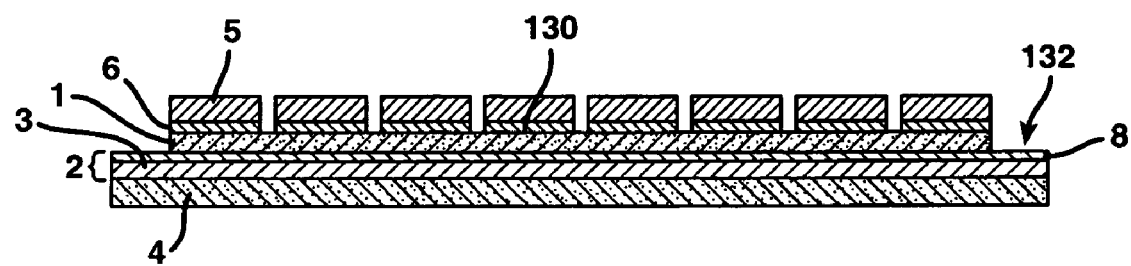
FIG. 3 is a sectional view of a third preferred embodiment of the receptacle of the present invention.
Figure 4:
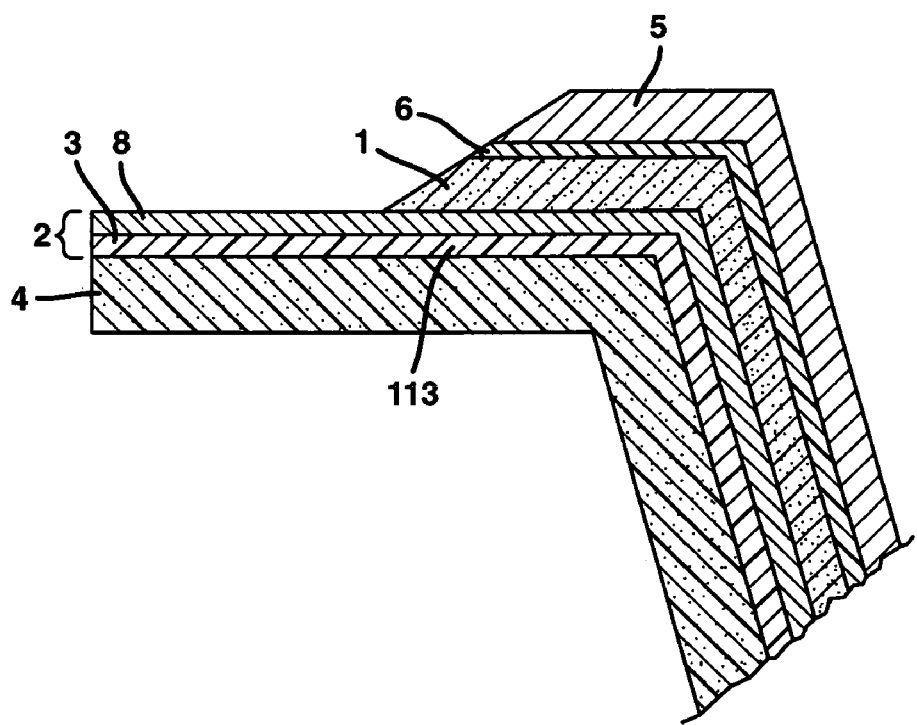
FIG. 4 is an enlarged sectional view of the flange portion of a receptacle of the first preferred embodiment illustrated in FIG. 1.

In another embodiment of the present invention, the receptacle is an almost flat support 130 i.e. a dish-shape receptacle, that may have e.g. a rectangular, round, oval or squared surface and the flange 132 is the outward edge of said flat support 130. Said latter embodiment is illustrated in FIG. 3.

In both embodiments, the surface exposed along a closed line in the circumferential flange, i.e. in the closed line provided for sealing the lid to the receptacle, is the surface of the non-perforated liquid- and gas-barrier film. By sealing a liquid- and gas-barrier lid to the exposed surface of the liquid- and gas-barrier film of the receptacle along said closed line in the circumferential flange, it is then possible to obtain a self-absorbing, gas-barrier, package.

The exposure of the liquid- and gas-barrier film along the sealing line in the receptacle according to the present invention is preferably achieved starting from a dish- or tray-shaped laminate, including both the absorbent layer and the liquid- and gas-barrier film and removing the uppermost layers, including the absorbent layer and any liquid pervious layer on top thereof, along said sealing line.

Alternatively however it can also be achieved starting from a dish- or tray-shaped laminate that comprises the absorbent layer but not the liquid- and gas-barrier film and adhering the liquid- and gas-barrier film to the shaped laminate in such a way that the liquid- and gas-barrier film extends circumferentially over the flange edge of the dish- or tray-shaped laminate.

Still alternatively it would be possible to obtain the end receptacles starting from a continuous sheet or from discrete pieces of a flat laminate of the overall multi-layer structure wherein however the size and the position of the laminate of the upper layers, i.e. those on top of the liquid- and gas-barrier thermoplastic film, are suitably set to provide directly for the desired product upon in registry thermoforming.

According to a most preferred embodiment of the present invention the thermoplastic multi-layer sheet of the base portion of the receptacle of the invention comprises in addition to a liquid absorbing layer and a liquid- and gas-barrier thermoplastic film, also a structural support layer that is preferably "lower" with respect to the liquid- and gas-barrier thermoplastic film, and a liquid-pervious, food-contact layer.

The liquid absorbing layer may comprise any type of liquid absorbing material.

In one preferred embodiment the liquid absorbing layer is made of an open cell foam material. A thermoplastic foamed sheet, in which the cells are at least for their majority open, i.e. intercommunicating, may in fact absorb and store liquids, similarly to a sponge. Any type of polymer than can be foamed giving an open cell structure can suitably be employed for this absorbent layer. Examples of suitable polymers include polyethylenes, either homo-polymers or copolymers, such as ethylene-α-olefin copolymers and ethylene-vinyl acetate copolymers, chlorinated polyethylenes, polypropylene-based resins, polystyrene and polystyrene copolymers, polyesters, such as polyethylene terephthalate, and the like polymers. The thickness of the open-cell foam absorbing layer is typically comprised between about 0.1 mm and about 10 mm, preferably between about 1 mm and about 4 mm. To increase liquid absorption by the open cell foam material it may be advisable to treat the internal cell surface or at least the exposed surface thereof with a surfactant such as a salt of a sulphuric acid or a sulphuric ester.

When an absorbent layer of open cell foam material is employed, by suitably selecting the % of open cells, the size of the cells and the thickness of the layer itself, it is possible to obtain thermoplastic sheets with an absorbency of from 500 to 1,500 ml/m$^2$.

The open cell foam material may be used as the food-contact layer. However in a preferred embodiment said open cell foam absorbent layer is an internal layer, and the multi-layer structure also comprises an upper, food-contact layer. The purpose of said food-contact layer is mainly that of hiding from view the liquid absorbed in the subsisting absorbing layer, such as the reddish meat drip or the yellowish poultry drip, and for this reason said separate food-contact layer is preferably opaque.

The use of a separate food-contact layer also improves the thermal molding behavior of the thermoplastic multi-layer sheet in case it is thermoformed into a tray.

To allow the fluids to pass downward from the food contact surface into the absorbing layer, said upper food-contact layer is provided with perforations. Preferably the perforations have a small diameter, typically lower than 1.5 mm, preferably lower than 1.2 mm, and more preferably lower than 1 mm, and are regularly distributed on the surface of the sheet. The number of perforations per m$^2$ will depend on the average diameter of the perforations and may suitably be comprised between 500 and 40,000, preferably between 1,000 and 10,000. The perforations are typically arranged in parallel rows that may be off set one respect to the other. The perforations are normally funnel-shaped towards the inside of the sheet and may have a round or slightly oval section, particularly in the regions where the sheet is stretched to form it into a tray. To further improve the absorbency of the absorbing layer, preferably the perforations extend also in said absorbent layer.

Said separate food contact layer can be of any thermoplastic material and the preferred ones are those providing for a good bond with the underlying open cell foam layer. Generally the same resin used for the open cell foam layer can be employed as a thick non-foamed layer for the food-contact layer. It would be further advantageous if also this layer would be sealable to the lid to avoid that the absorbed drip percolates along the edges of the absorbing layer if the receptacle is positioned vertically. The thickness of said food-contact layer is typically comprised between about 3 $\mu$m and about 100 $\mu$m, preferably between about 5 $\mu$m and about 80 $\mu$m, more preferably between about 8 $\mu$m and about 50 $\mu$m.

Alternatively the food-contact layer is not perforated but is of a porous, liquid pervious, material. Examples of porous materials that may be pervious to liquids are some non-woven films or some void-containing films where the pattern of voids in the polymer matrix allows the passage of liquids by capillarity. Typically these liquid pervious films are made of polyolefin resins. In particular, commercially available non-woven polyethylene films or void-containing polypropylene films can suitably be employed for the food contact layer.

In another embodiment the absorbing layer will comprise super absorbent polymer (SAP) particles, wherein the term "SAP" refers to any water-swellable homo- or co-polymer known in the art that may absorb and hold many times its weight of aqueous fluids. Typically these water-swellable polymers possess a structure in which a water-soluble polymer has been made insoluble by some process, typically by means of well-known multi-functional cross-linking agents employed during or after polymerization, or by radiation cross-linking or by thermal treatments. Examples of water-swellable polymers that may suitably be employed in the absorbent layer of the present laminate include: poly(acrylic acid) salts, poly(acrylate) salts, poly(vinyl alcohol-acrylic acid) salts, poly(isobutylene-maleic acid) salts, poly(ether)-based non ionic polymers, sodium carboxymethylcellulose, poly(vinylpyrrolidone), acrylonitrile-grafted starch, acrylic acid grafted-starch, and the like polymers.

Super absorbent polymers suitable for food packaging pertaining to the class of poly(acrylic acids) and poly(acrylates) are commercially available from e.g. Dow and Chemdal.

Another class of SAP particularly suitable for food packaging applications is that of cross-linked poly(vinylpyrrolidones), such as those commercially available from BASF (Kollidon®).

SAP are generally provided in the form of particulate materials, typically in the form of finely divided powders. For use in the manufacture of the absorbent layer of the sheet of the present invention they are preferably embedded in a polymeric matrix or bonded with a polymeric binder to allow either the extrusion thereof in a film layer, or its distribution on a thermoplastic substrate by a continuous or discontinuous coating process or by spraying.

The overall amount of SAP that will be contained in absorbent layer will depend on the type of food product packaged and on the absorbency of the particular SAP employed. Typically for food packaging the maximum absorbency required is about 1,500 ml/m².

When a SAP is employed for the liquid absorbing layer, said layer is an internal layer and a separate food-contact layer is necessarily present to avoid any active drawing out of the fluid from the food product that might occur if the food product is directly in contact with the absorbent. By suitably combining the dimension of the holes in the food-contact layer, with the thickness of this layer—depending on the weight and firmness of the food product—it is possible to prevent any direct contact between the food product and the absorbing layer even in correspondence of the holes, and by suitably selecting the number of holes as well as the more-or-less hydrophobic nature of the resin employed for this layer, it is possible to achieve the absorbency of all the fluids that are spontaneously generated by the packaged food product without the undesired drying out of the food product.

Using a SAP for the liquid absorbing layer, it might be desirable in certain instances to have in the structure an additional layer, a "distribution" layer, positioned between the fluid absorbing layer and the food-contact layer. Such a distribution layer might be useful to increase the efficiency of the absorbent layer by better distributing the fluids therein. Said optional distribution layer may have an absorbing capacity, but this is not a necessary feature. It may distribute the fluids that drip from the food-contact layer by a chemical or a physical mechanism. In the former case said layer will comprise a polar hydrophilic polymer such as a poly(acrylic acid), a poly(acrylate), or another similar polymer, that preferably contains also surface active agents. In the latter case the distribution of the fluids will be obtained using a fibrous or slightly foamed open cell layer of a low melting polymer or a layer where the fibrous material is embedded into a polymer matrix that may optionally be slightly foamed.

In line of principle any other alternative liquid absorbing material can be used for the liquid absorbing layer in the receptacle according to the present invention, the above listed materials representing only preferred embodiments thereof.

The multi-layer thermoplastic structure of the receptacle of the present invention also comprises a thermoplastic liquid and gas-barrier film.

In the end package said thermoplastic film will be farther from the food product than the liquid absorbing layer. While in a preferred embodiment said liquid- and gas-barrier film is adjacent to the liquid absorbing layer, in some instances one or more additional layers can be imposed between the liquid absorbing layer and the thermoplastic liquid- and gas-barrier film.

Actually the liquid- and gas-barrier film may be a monolayer film of a gas-barrier resin but preferably it is a multi-layer film wherein at least one layer has gas-barrier properties.

Non-limitative examples of gas-barrier polymers that can suitably be employed for the gas-barrier layer are EVOH, PVDC, and polyamides.

As used herein, the term EVOH includes saponified or hydrolyzed ethylene-vinyl acetate copolymers, and refers to vinyl alcohol copolymers having an ethylene comonomer content preferably comprised from about 28 to about 48 mole %, more preferably, from about 32 to about 44 mole % ethylene, and even more preferably, from about 36 to about 42 mole % ethylene, and a saponification degree of at least 85%, preferably at least 90%.

The term PVDC refers to a vinylidene chloride copolymer wherein a major amount of the copolymer comprises vinylidene chloride and a minor amount of the copolymer comprises one or more unsaturated monomers copolymerisable therewith, typically vinyl chloride, and alkyl acrylates or methacrylates (e.g. methyl acrylate or methacrylate) or to a blend thereof in different proportions. Generally said PVDC contains plasticisers and/or stabilizers as known in the art.

The term polyamide is intended to refer to both polyamides and co- or ter-polyamides. This term specifically includes aliphatic polyamides or co-polyamides, aromatic polyamides or co-polyamides, and partially aromatic polyamides or co-polyamides, modifications thereof and blends thereof.

As gas-barrier material also blends of EVOH with polyamides can suitably be employed.

The gas-barrier material may also consist of a silica-coated film or anyway of a film of thermoplastic material with deposited a thin layer of inorganic metal oxides (typically silica or alumina) known to provide barrier properties in critical packaging applications.

Preferably however the barrier layer will comprise a thermoplastic polymer selected from the group consisting of PVDC, EVOH, and polyamides. Even more preferably the barrier layer will comprise PVDC or EVOH.

The thickness of the gas-barrier layer will be set in order to provide the overall multi-layer sheet with an Oxygen Transmission Rate (OTR) (evaluated by following the method described in ASTM D-3985 and using an OX-TRAN instrument by Mocon) lower than 10, preferably lower than 5 cm³/m².d.atm, when measured at 23° C. and 0% of relative humidity.

Typically when PVDC or EVOH are employed as the gas-barrier materials, this is achieved with barrier layers 3–4 μm thick. Thicker layers can be used if desired or if a lower OTR is needed, while thinner layers can be used e.g. if a polymer with higher barrier properties is employed.

Preferably the liquid- and gas-barrier film is a multi-layer film comprising in addition to a gas-barrier layer at least a heat-sealable layer, because the surface of the gas-barrier film that will be exposed in the flange of the receptacle of the invention should preferably be heat-sealable in order to give a hermetic seal with the closing lid by a conventional heat-sealing step. Said heat-sealable layer can comprise any thermoplastic material that can be heat-sealed to the sealing layer of the barrier lid that will close the package. The preferred material will therefore depend on the material used for the heat-sealing layer of the closing lid. Generally said heat-sealable thermoplastic material will be selected among the polyolefins, such as polyethylene homo- or co-polymers, propylene copolymers, etc., the styrene homo- or copolymers, such as for instance polystyrene, styrene-butadiene-styrene block terpolymer (SBS), styrene-ethylene/butene-styrene block terpolymer (SEBS), and styrene-isoprene-styrene block terpolymer (SIS), and the hydrogenated derivatives thereof, and the polyester homo- and co-polymers, such as poly-ethylene terephthalate homopolymer (PET), polyethylene terephthalate copolymers e.g. PETG, a glycol-modified polyethylene terephthalate, polyethylene naphthalate homopolymer (PEN), and polyethylene naphthalate copolymers.

As used herein ethylene and propylene co-polymers refer to the co- or ter-polymers containing a major amount of respectively ethylene or propylene and a minor amount of one or more other olefins and/or a non-olefinic comonomer copolymerizable therewith.

Typical examples of materials suitable for said heat-sealable layer are polyolefins, preferably ethylene homopolymers, homogeneous and heterogeneous ethylene-α-olefin copolymers, ethylene-vinyl acetate copolymers, ionomers, etc., as well as blends of these polymers in any proportions, and styrene polymers, preferably SBS optionally blended with polystyrene.

Suitable blends may also include peelable blends to provide the receptacle with an easy-to-open feature.

The thickness of said heat-sealable layer will be typically comprised between about 2 µm and about 100 µm, preferably between about 6 µm and about 80 µm, more preferably between about 10 µm and about 50 µm.

Additional layers, such as tie layers, to better adhere the gas-barrier layer to the adjacent layers, may be present in the thermoplastic liquid- and gas-barrier film and are preferably present depending in particular on the specific resins used for the gas-barrier layer and on the possible presence of a separate structural layer.

Suitable adhesive layers will comprise thermoplastic polymers such as ethylene-vinyl acetate copolymers with high vinyl acetate content (e.g. 18–28 wt. % or even more), ethylene-(meth)acrylic acid copolymers, ethylene homopolymers or co-polymers modified with anhydride or carboxylic acid functionalities, styrene-butadiene copolymers optionally modified with anhydride or carboxylic functionalities, and the like known resins.

The thermoplastic multi-layer structure of the invention needs to have a rigidity sufficient to provide structural integrity and support for the food product without undue distortion of the receptacle and this can be obtained either using a thermoplastic liquid- and gas-barrier film of a sufficient thickness, e.g. higher than about 100 µm, generally obtained by including in the thermoplastic film one or two bulk layers or, in a preferred embodiment, providing for a separate structural layer.

In such a case the separate structural layer can be made of a single layer or be a multi-layer structure. It can be manufactured from any suitable thermoplastic material, such as for instance polystyrene polymers, polypropylene polymers, polyesters, e.g. polyethylene terephthalate, polyethylenes, PVC, and the like polymers, and be either foamed or solid. In case of a multi-layer structure, part of it can be foamed and part can be cast.

Said structural support layer would preferably be farther to the food product to be packaged in the end receptacle according to the present invention than the liquid- and gas-barrier thermoplastic film and in a most preferred embodiment one surface thereof will be the outer abuse-resistance surface of the end receptacle.

When the structural support layer is "lower" than the thermoplastic liquid- and gas-barrier film, the flange of the container, particularly of the tray-shaped container, will have the necessary rigidity for the tray to be used in any type of packaging machine including those where the tray is held on the carrier plate of a lidding machine and the bottom of the tray is unsupported.

In a preferred embodiment the structural support layer is a monolayer made of a foamed polymer. In a most preferred aspect of said embodiment the structural support layer is of foamed polystyrene.

In another preferred embodiment the structural support layer is a monolayer of a solid, cast polymer. In a most preferred aspect of said embodiment the structural support layer is of cast polypropylene, polyester, high density polyethylene, polystyrene, high impact polystyrene, or PVC.

The thickness of the separate structural support layer is typically comprised between about 0.1 and 7 mm, depending mainly on whether it is a foamed or a cast material. Structural support layers made of a cast solid material are preferably from 0.1 to 3 mm thick while structural support layers of a foamed material are preferably from 1 to 7 mm thick.

Thicker layers however can be employed, if needed to get the required stiffness, provided that the end multi-layer sheet can still be formed into a receptacle of the desired shape.

As indicated above, in a preferred embodiment the liquid- and gas-barrier film is adjacent to the liquid absorbing layer. In some instances however one or more additional layers can be imposed between the liquid absorbing layer and the thermoplastic liquid- and gas-barrier film. In such a case said additional, intermediate, layer or layers can comprise any type of material, such as for instance closed-cell foam material, or scrap, preferably but not necessarily from the same tray manufacturing process. Said additional layer may thus provide the desired stiffness to the end sheet without recurring to a separate structural support layer "lower" than the thermoplastic liquid- and gas-barrier film or to a thick thermoplastic liquid- and gas-barrier film.

In a preferred embodiment of the present invention the multi-layer sheet used to form the receptacle will comprise (from the outermost abuse resistant layer to the innermost food-contact layer) a structural support layer, typically of material, such as foam polystyrene foam polyester or foam polypropylene, or a cast mono-layer sheet of e.g. polypropylene, poly-vinyl chloride, or polyester; the liquid- and gas-barrier thermoplastic film comprising a gas-barrier layer and a heat-sealable layer; a liquid absorbing layer; possibly a distribution layer and a liquid pervious food contact layer. The overall thickness of this multi-layer sheet will typically be up to 1.2 cm and preferably up to 1.0 cm, as known and conventional in this area. Preferably it will be comprised between 0.1 and 0.8 cm and more preferably between 0.2 and 0.7 cm.

In a preferred method of manufacture of the receptacle of the invention a uniform laminate comprising both the absorbing layer and the liquid- and gas-barrier thermoplastic film is obtained, shaped as desired and carved at the flange to expose the heat-sealable layer of the liquid- and gas-barrier thermoplastic film.

More particularly, construction of the multi-layer sheet that can then be converted into the receptacle according to the present invention may be accomplished in several ways. The various layers, i.e. the separate structural support layer, if present, the liquid- and gas-barrier thermoplastic film comprising the gas-barrier layer, the liquid absorbing layer and the food-contact layer, if present, may be formed separately using standard equipment and techniques and then laminated together by e.g. heat-lamination, glue-lamination, or extrusion lamination. When the absorbing layer is obtained by means of a SAP containing latex dispersion, said dispersion can be distributed on a surface of either one of the adjacent layers and the obtained partial structure containing at least two layers is then laminated to the rest of the structure by the same general methods.

Alternatively part of the overall structure may be obtained by co-extrusion and then laminated to the remaining parts.

When a thermoplastic film coated with a thin layer of metal oxides, such as a silica coated polyethylene layer, is employed as the gas-barrier layer, the adhesion of said layer to the adjacent ones may be obtained using a polyolefin modified with anhydride or carboxylic functionalities or with any water- or solvent-based glue approved for food packaging applications.

As an example, one suitable method of construction of a preferred laminate of the present invention would involve a. extrusion foaming the structural support layer,
b. heat-laminating said layer to an extruded or co-extruded liquid- and gas-barrier film,
c. heat-laminating the free surface of the liquid- and gas-barrier thermoplastic film in the above laminate with the liquid absorbing layer, and finally
d. heat- or glue-laminating a pre-perforated or liquid pervious food-contact layer on top of the liquid absorbing layer.

Alternatively the heat-lamination steps b. and c. above can be carried out simultaneously and/or the lamination of the food-contact layer to the absorbing layer can be carried out before laminating said layer to the liquid- and gas-barrier thermoplastic film.

If a distribution layer is present the above method may include, as the last but one step, the optional step of laminating said layer to either the absorbing layer or the food-contact layer or of coating it onto one of said layers. When said optional distribution layer is made of a thermoplastic polymer it can also be co-extruded together with the food-contact layer and/or the liquid absorbing layer.

Still alternatively, the food-contact layer can be applied as a solid instead of a pre-perforated film and any perforation, if needed, can then be carried out on the end laminate, paying particular attention however not to perforate the gas-barrier layer in the liquid- and gas-barrier thermoplastic film.

After the laminate has been constructed, a receptacle may be shaped by any known technique.

As an example the self-absorbing receptacle may be shaped into a tray or in the form of a flat support (a dish-like shape) that may have e.g. a rectangular, round, oval or squared surface by thermoforming, vacuum forming, stamping or any other technique available.

This is typically obtained by thermoforming, where the multi-layer sheet is first molded and then, generally in a separate station, the molded parts are trimmed out while the remaining sheet "skeleton" is ground up for reuse.

With reference to FIGS. 1 and 2, that illustrate two different embodiments of the receptacle according to the present invention in the tray-shaped configuration, the tray 110 (or 120) has a bottom or base portion 111 (or 121) that may be flat or concave or convex or of any other shape, side walls 112 (or 122) and an outwardly directed flange 113 (or 123), which extends around the rim or periphery of the tray. The multi-layer structure illustrated in these Figures comprises a liquid absorbent layer 1, a distribution layer 6, a food-contact layer 5 (both these latter layers are illustrated in the Figures as being perforated by perforations 115 (or 125); said layers however could alternatively be imperforated but liquid pervious), a liquid- and gas-barrier thermoplastic film 2 comprising a gas-barrier layer 3 and a heat-sealable layer 8, and a separate support layer 4.

Either during or after the forming step, the flange of the container is carved by removing the absorbent layer 1 as well as the food-contact layer 5 and the distribution layer 6, on top of the absorbent one, and possibly part of the thermoplastic film 2 to expose along a closed line 114 (or 124) in the circumferential flange, the heat-sealable layer 8 of the liquid- and gas-barrier film 2.

As illustrated in FIG. 1 the absorbing layer is removed along the outward circumferential part of the flange for a width sufficient to guarantee a hermetic sealing of the thermoplastic lid thereto. Alternatively as illustrated in FIG. 2 said carving is carried out in an internal part of the flange thus creating a track of a width sufficient for sealing the lid thereto.

Removal can be obtained by cutting through the absorbing layer 1, any upper layer 5 and 6, and any layer in-between the absorbing layer 1 and the heat-sealable layer 8, to reach the heat-sealable layer 8 and then tearing horizontally to remove the uppermost layers in the outward circumferential part of the flange. The cut can be made in a direction substantially perpendicular to the flange or at an oblique angle relative to the plane of the flange, wherein angles of between 30° and 90° would be suitable. This step can be carried out either on the finished trimmed out containers or, preferably, after the thermoforming step but before trimming out the molded parts, so that a skeleton of the upper layers, including the liquid absorption layer 1, and the food contact layer 5 and distribution layer 6, if present, is removed altogether. The molded parts are then suitably trimmed out to get the final receptacles with the outward circumferential part of the flange made up of the lower layers only.

If it is desired to create a track in the flange then two different cuts should be made therein and only the portion between these two cuts will be removed.

In both cases the cuts can be made by any conventional means, including blades, hot knives/wires, laser etc.

To facilitate removal of the upper layers as desired to expose the heat-sealable layer 8 of the liquid- and gas-barrier thermoplastic film 2, it would be highly preferable to take advantage of anyone of the various mechanisms known and used in the art for separating two films or layers, e.g. using a heat-sealable layer 8 that has a very low bond with the adjacent layer, i.e. the liquid absorbing layer 1 or any additional intermediate layer 11 positioned between these two layers (a bond much lower than the bond between any other two adjacent layers in the structure) or using a heat-sealable layer 8 that is made of a blend of materials with a very low internal cohesion so that the separation occurs through the thickness of layer 8 via a mechanism of cohesive failure.

In the former case the rupture of the upper layers of the laminate is followed by the peeling off of the upper layers from the heat-sealable layer 8. In this case it is necessary to suitably select the materials employed for both the heat-sealing layer 8 and the adjacent layer, be it the liquid absorbing layer 1 or a possible additional layer 11, and the manufacturing process in order to get a low bond between said two layers. Typically this is achieved by selecting polymeric materials having a great chemical dissimilarity and using processes other than co-extrusion for bonding said two layers.

In the latter case the rupture of the upper layers of the laminate is followed by the internal rupture of the heat-sealing layer 8 along a plane parallel to the layer itself. Examples of blends of materials that are only partially compatible and that consequently can fail when a transversal force is applied thereto are for instance blends of an ionomer having a melt flow index of less than 5 g/10 min and a modified ethylene/vinyl acetate copolymer having a substantially higher melt flow index, whereby the melt flow indices of the two polymers in the layer differ by at least 10, or blends of a copolymer of ethylene and acrylic acid or methacrylic acid, a modified EVA copolymer, and a polybutylene.

Figure 7:
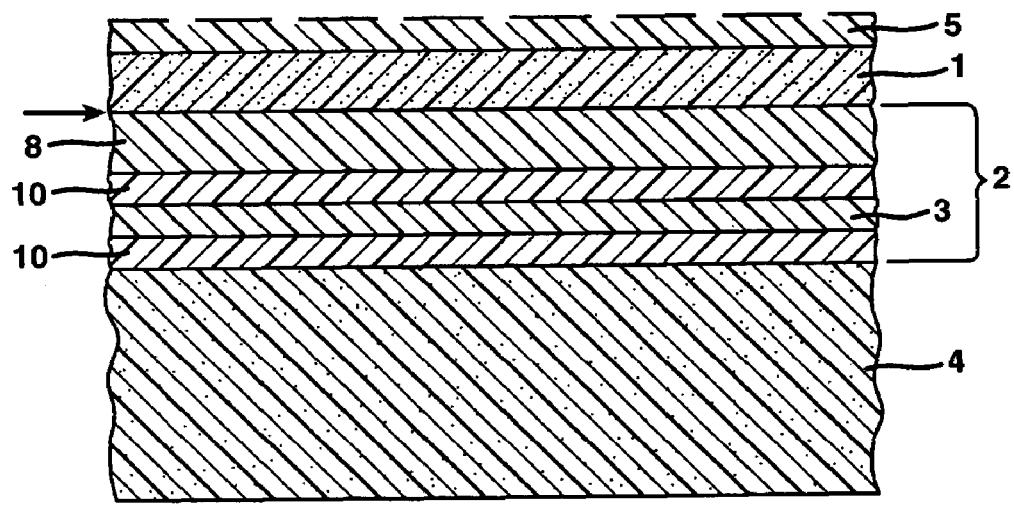
FIG. 7 is a cross-sectional view of one preferred multi-layer thermoplastic structure suitable for the manufacture of a receptacle according to the present invention.
Figure 8:
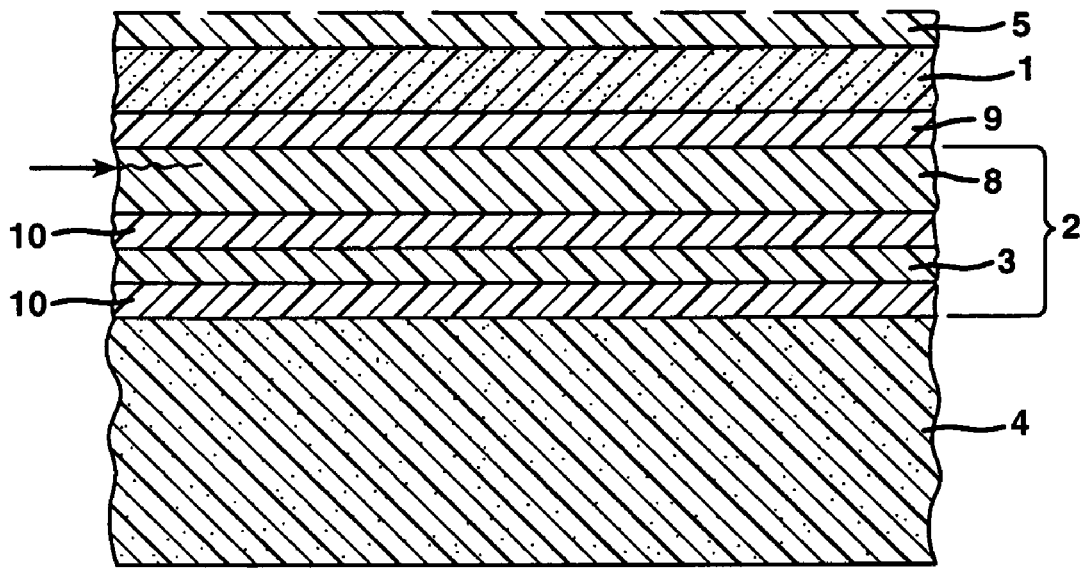
FIG. 8 is a cross-sectional view of another preferred multi-layer thermoplastic structure suitable for the manufacture of a receptacle according to the present invention.
Figure 9:
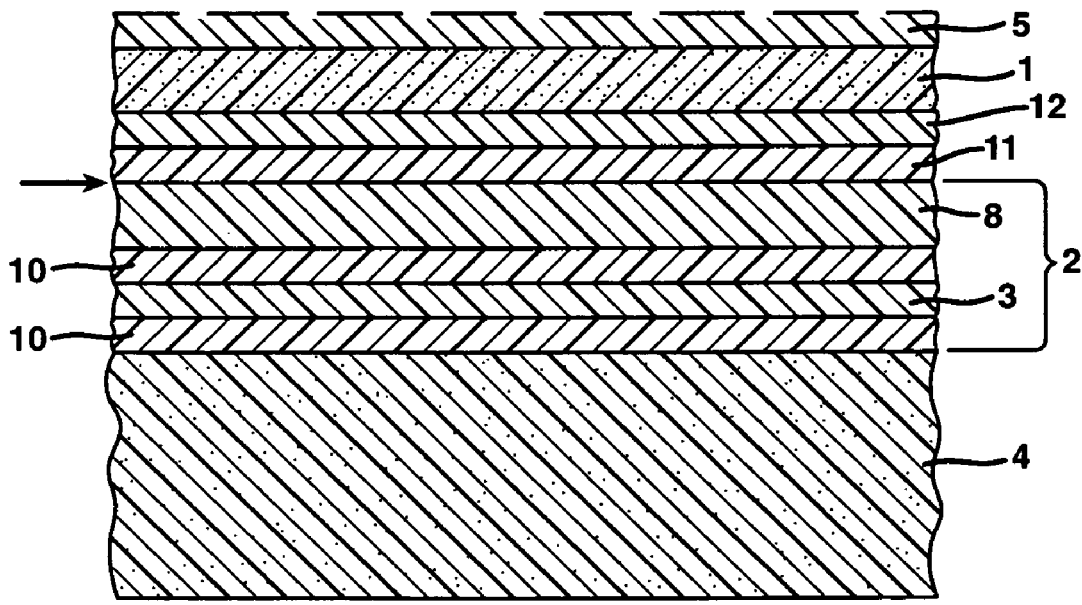
FIG. 9 is a cross-sectional view of still another preferred multi-layer thermoplastic structure suitable for the manufacture of a receptacle according to the present invention.
Figure 10:
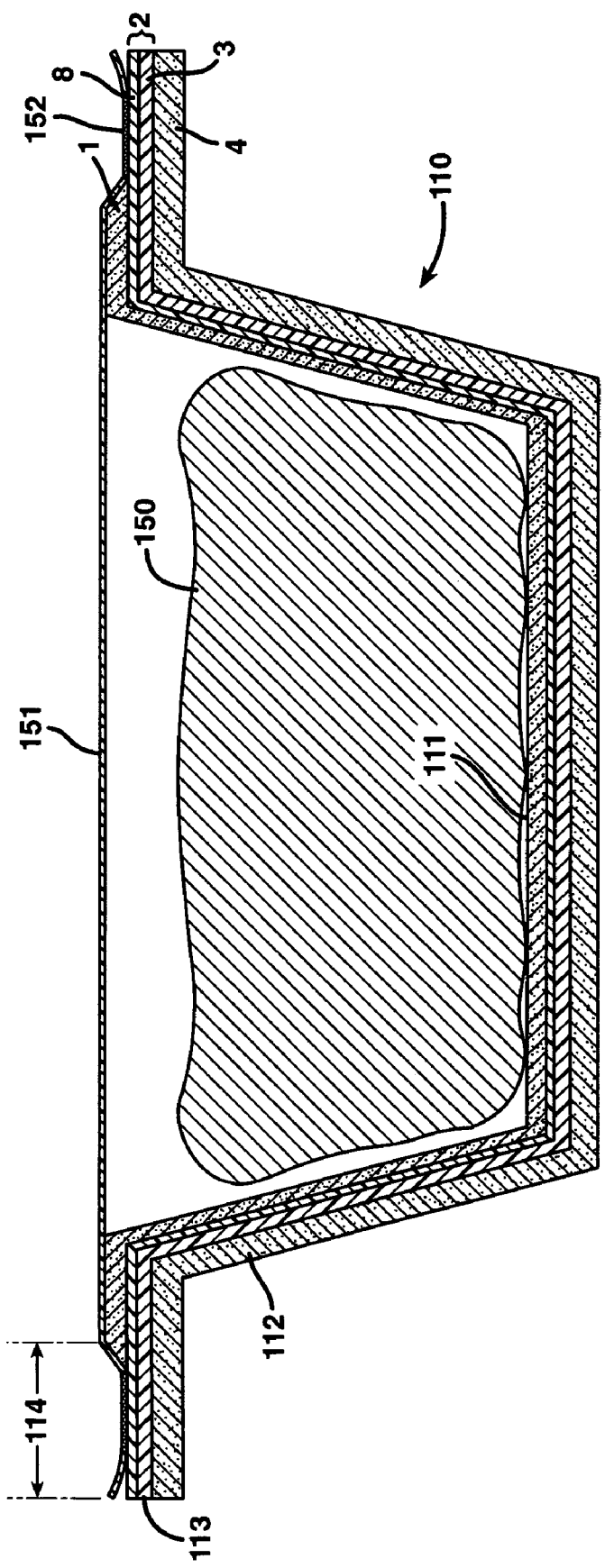
FIG. 10 is a sectional view of a package of the present invention comprising a receptacle similar to that of FIG. 1, but having the liquid absorbing layer 1 forming the surface of the product storage side of the multi-layer structure in the product storage zone of the receptacle.

Examples of laminates suitable for the manufacture of a receptacle according to the present invention based on the above mechanisms are specifically illustrated in FIGS. 7, 8 and 9. More particularly said Figures illustrate preferred embodiments of the receptacle according to the invention.

FIG. 7 illustrates a laminate where the bond between the heat-sealing layer 8 and the adjacent liquid absorbing layer 1 is sufficiently low to allow peeling off of the cut portion. In said preferred embodiment the structural layer 4 is a foamed polystyrene layer, either open-cell or, preferably, closed-cell; the liquid- and gas-barrier thermoplastic film 2 comprises a core gas-barrier layer 3 comprising an ethylene-vinyl alcohol copolymer, two tie layers 10 comprising a carboxy or anhydride modified polyolefin, and a heat-sealing layer 8 comprising a polyethylene or an ethylene-α-olefin copolymer; the liquid absorbing layer 1 is of open-cell foam polystyrene; and the perforated food contact layer 5 is of non foamed polystyrene. The bond at the interface between the liquid absorbing layer 1 and the heat-sealing layer 8 is very low and once the cut in the thickness of the upper layers reaches said heat-sealing layer 8, the horizontal tearing will expose the heat-sealing layer 8. The arrow indicates the rupture line.

FIG. 8 on the other hand illustrates the case where the heat-sealing layer 8, that in the embodiment illustrated in said Figure is not the outer layer of the liquid- and gas-barrier thermoplastic film 2, breaks by cohesive failure and allows removal of the upper layers in the receptacle flange. More particularly in said preferred embodiment the structural layer 4 is a foamed polystyrene layer, either open-cell or, preferably, closed-cell; the liquid- and gas-barrier thermoplastic film 2 comprises a core gas-barrier layer 3 comprising an ethylene-vinyl alcohol copolymer, two tie layers 10 comprising a carboxy or anhydride modified polyolefin, a heat-sealing layer 8 comprising a blend of an ionomer having a melt flow index of about 1.25 g/10 min and a modified ethylene/vinyl acetate copolymer having a melt flow index of about 25 g/10 min, and a layer 9 comprising a resin such as styrene-butadiene-styrene copolymer, polystyrene, or ethylene-vinyl acetate copolymer; the liquid absorbing layer 1 is of open-cell foamed polystyrene; and the perforated food contact layer 5 is of non foamed polystyrene. Owing to the poor compatibility between the blend components of the heat-sealing layer 8, once the cut in the thickness of the upper layers reaches said heat-sealing layer 8, the rupture will occur transversely as indicated by the arrow through the thickness of said heat-sealing layer 8.

FIG. 9 illustrates another embodiment of a laminate where the bond between the heat-sealing layer 8 and the adjacent intermediate layer 11 is sufficiently low to allow peeling off of the cut portion. In said preferred embodiment the structural layer 4 is a foamed polystyrene layer, either open-cell or, preferably, closed-cell; the liquid- and gas-barrier thermoplastic film 2 comprises a core gas-barrier layer 3 comprising an ethylene-vinyl alcohol copolymer, two tie layers 10 comprising a carboxy or anhydride modified polyolefin, and a heat-sealing layer 8 comprising a polyethylene or an ethylene-α-olefin copolymer; the liquid absorbing layer 1 is of open-cell foam polystyrene; the perforated food contact layer 5 is of non foamed polystyrene; the intermediate layer 11, having a low bond with the heat-seal layer 8, is of styrene-butadiene-styrene copolymer and a closed-cell polystyrene foam layer 12 is positioned between the liquid absorbing layer 1 and the intermediate layer 11. The bond at the interface between the intermediate layer 11 and the heat-sealing layer 8 is very low and once the cut in the thickness of the upper layers reaches said heat-sealing layer 8, the horizontal tearing will expose the heat-sealing layer 8. The arrow indicates the rupture line.

Alternatively the receptacle according to the present invention can be manufactured by shaping as desired a first laminate comprising the liquid absorbing layer 1 and any upper layer but not the liquid- and gas-barrier thermoplastic film and any lower layer, and then coupling said laminate with a laminate of a larger size, comprising said lower layers only. In case of a dish-shape receptacle this can be easily achieved by cutting the two partial laminates in such a way that the laminate comprising the liquid- and gas-barrier thermoplastic film has the same shape but is larger in size with respect to the laminate comprising the liquid absorbing layer and combining the two laminates by heat or glue lamination. When the receptacle is tray-shaped, this may be achieved by a vacuum skin lining process carried out with the liquid- and gas-barrier thermoplastic film on the lower surface of the tray-shaped laminate comprising the liquid absorbing layer or by thermoforming the lower layers of a size slightly larger than the upper layers and with a larger flange and then combining the two tray-shaped parts into a single tray.

A further specific object of the invention is the use of a receptacle according to the present invention in the packaging of a food product in a modified atmosphere wherein the food product is loaded onto or into a self-absorbing gas-barrier receptacle according to the present invention, modified atmosphere is introduced into the package by gas flushing, with or without prior vacuumization, followed by the sealing of a gas-barrier film or lid along a sealing line in the flange of the receptacle where the exposed surface is that of the heat-sealing layer 8 of the liquid- and gas-barrier thermoplastic film 2 to provide for a hermetically closed modified atmosphere package.

Figure 5:
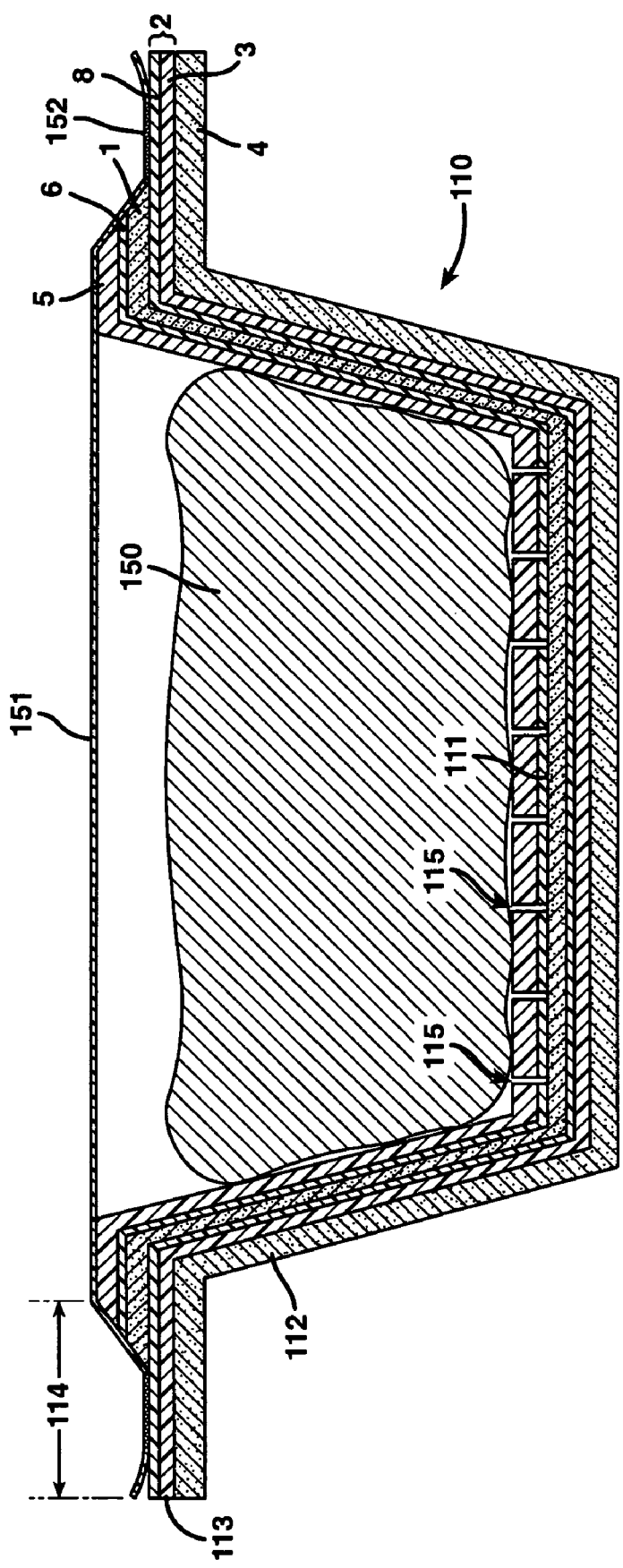
FIG. 5 is a sectional view of a package of the present invention obtained using the receptacle of FIG. 1.
Figure 6:
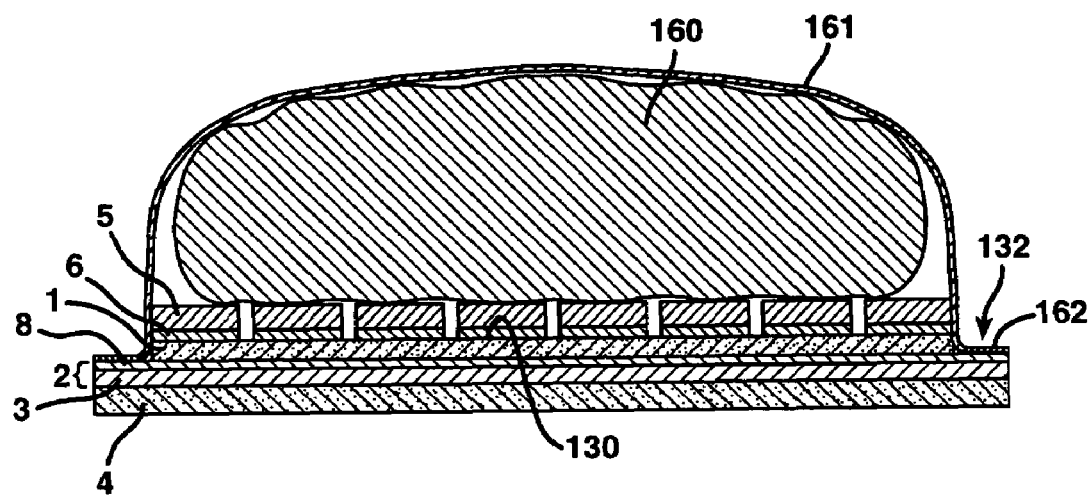
FIG. 6 is a sectional view of a package of the present invention obtained using the receptacle of FIG. 3.

Examples of packages are illustrated in FIGS. 5 and 6 where FIG. 5 refers to a package where the product 150 is placed into a tray-shaped receptacle 110 (as illustrated in FIG. 1) and the package is then closed by sealing a gas-barrier lid 151 to the exposed surface of the heat-sealing layer 8 along a closed line 152 in tray flange. The lid can be a flexible, semi-rigid or rigid film or sheet. It can be stretchable or non stretchable, oriented or non-oriented and if oriented it can be heat-shrinkable or heat-set. Also the gas-barrier lid 151 may be a monolayer or a multi-layer structure provided it is endowed with gas-barrier properties. Preferably however it will be a multilayer structure comprising at least a gas-barrier layer and a heat-sealable layer to create with the exposed surface of the heat-sealable layer 8 of the receptacle a hermetic seal.

FIG. 6 shows a flat support 130, as illustrated in FIG. 3, with a product 160 loaded thereon and a flexible, oriented or non oriented, heat-shrinkable or non heat-shrinkable, stretchable or non stretchable gas-barrier lid 161 sealed to the exposed surface of the heat-sealable layer 8 of the liquid- and gas-barrier thermoplastic film 2 along the closed line 162 at the circumferential flange 132.

What is claimed is:

1. A receptacle useful in packaging a food product between the receptacle and a lid, the receptacle comprising:
   a product storage zone for supporting the product; and
   a sealing zone circumferentially extending around the product storage zone; and
   a multi-layer structure comprising:
   a liquid absorbent layer integral with the multi-layer structure;
   a gas-barrier film; and
   a support layer, wherein:

the multi-layer structure has a product storage side;
in the product storage zone of the receptacle, the liquid absorbent layer is closer than the gas-barrier film to the product storage side of the multi-layer structure; and
in the sealing zone of the receptacle, the gas-barrier film forms the surface of the product storage side of the multi-layer structure, whereby the lid may be sealed directly to the gas-barrier film in the sealing zone.

2. The receptacle of claim 1 wherein:
the receptacle comprises a depressed region and a flange circumferentially extending around the depressed region; and
the flange comprises the sealing zone.

3. The receptacle of claim 1 wherein the liquid absorbent layer forms the surface of the product storage side of the multi-layer structure in the product storage zone of the receptacle.

4. The receptacle of claim 1 wherein the multi-layer structure has a configuration comprising:
a bottom portion;
one or more side walls extending from the bottom portion; and
a flange extending outwardly from the one or more side walls substantially parallel to the bottom portion, wherein the flange comprises the sealing zone.

5. The receptacle of claim 1 wherein in the product storage zone the support layer is farther than the gas-barrier film from the product storage side of the multi-layer structure.

6. The receptacle of claim 1 wherein the liquid absorbent layer comprises an open cell foam.

7. The receptacle of claim 1 wherein the liquid absorbent layer comprises a superabsorbent polymer.

8. The receptacle of claim 1 wherein the gas-barrier film comprises:
a gas-barrier layer; and
a heat-seal layer, wherein the heat-seal layer is closer than the gas-barrier layer to the product storage side of the multi-layer structure.

9. The receptacle of claim 8 wherein:
a first side of the heat-seal layer is directly adjacent the liquid absorbent layer and a second side of the heat-seal layer is directly adjacent another layer;
the heat-seal layer has a first bond strength to the liquid absorbent layer;
the heat-seal layer has a second bond strength to the another layer; and
the first bond strength is less than the second bond strength.

10. The receptacle of claim 1 wherein the multi-layer structure has an oxygen transmission rate of less than 10 cm$^3$/m$^2$.day.atm measured at 23° C. and 0% relative humidity according to ASTM D-3985.

11. A method of packaging a product comprising:
placing a product onto the product storage zone of the receptacle of claim 1;
sealing a lid to the gas-barrier film at the sealing zone of the receptacle to enclose the product between the lid and the receptacle.

12. The method of claim 11 wherein the product comprises a food product.

13. The method of claim 11 further comprising vacuumizing the space between the receptacle and the lid.

14. The method of claim 11 further comprising flushing the space between the receptacle and the lid with a modified atmosphere capable of extending the shelf life of the product.

15. A package comprising:
the receptacle of claim 1; and
a lid circumferentially sealed to the gas-barrier film at the sealing zone of the receptacle.

16. A receptacle useful in packaging a food product between the receptacle and a lid, the receptacle comprising:
a product storage zone for supporting the product; and
a sealing zone circumferentially extending around the product storage zone; and
a multi-layer structure comprising:
a liquid absorbent layer integral with the multi-layer structure; and
a gas-barrier film, wherein:
the multi-layer structure has a product storage side;
in the product storage zone of the receptacle, the liquid absorbent layer is closer than the gas-barrier film to the product storage side of the multi-layer structure;
in the sealing zone of the receptacle, the gas-barrier film forms the surface of the product storage side of the multi-layer structure, whereby the lid may be sealed directly to the gas-barrier film in the sealing zone; and
the multi-layer structure further comprises a liquid pervious layer forming the surface of the product storage side of the multi-layer structure in the product zone of the receptacle, the liquid pervious layer being adapted to allow liquid from the product to pass through the liquid pervious layer to the liquid absorbent layer.

17. The receptacle of claim 16 wherein the liquid pervious layer defines a plurality of perforations.

18. A receptacle useful in packaging a food product between the receptacle and a lid, the receptacle comprising:
a product storage zone for supporting the product; and
a sealing zone circumferentially extending around the product storage zone; and
a multi-layer structure comprising:
a liquid absorbent layer integral with the multi-layer structure; and
a gas-barrier film, wherein:
the multi-layer structure has a product storage side;
in the product storage zone of the receptacle, the liquid absorbent layer is closer than the gas-barrier film to the product storage side of the multi-layer structure;
in the sealing zone of the receptacle, the gas-barrier film forms the surface of the product storage side of the multi-layer structure, whereby the lid may be sealed directly to the gas-barrier film in the sealing zone; and
the liquid absorbent layer comprises a material selected from an open cell foam and a superabsorbent polymer.

19. The receptacle of claim 18 wherein the liquid absorbent layer comprises an open cell foam.

20. The receptacle of claim 18 wherein the liquid absorbent layer comprises a superabsorbent polymer.

21. The receptacle of claim 18 wherein the liquid absorbent layer forms the surface of the product storage side of the multi-layer structure in the product storage zone of the receptacle.

22. The receptacle of claim 18 wherein the multi-layer structure further comprises a liquid pervious layer forming the surface of the product storage side of the multi-layer structure in the product zone of the receptacle, the liquid pervious layer being adapted to allow liquid from the product to pass through the liquid pervious layer to the liquid absorbent layer.

23. The receptacle of claim 18 wherein the gas-barrier film comprises a gas-barrier polymer selected from one or more of ethylene/vinyl alcohol copolymer, vinylidene chloride copolymer, and polyamide.

24. The receptacle of claim 23 wherein the gas-barrier film comprises:
   a gas-barrier layer comprising the gas-barrier polymer; and
   a bulk layer.

25. The receptacle of claim 18 wherein the multi-layer structure has an oxygen transmission rate of less than 10 cm$^3$/m$^2$.day.atm measured at 23° C. and 0% relative humidity according to ASTM D-3985.

26. A method of packaging a product comprising:
   placing a product onto the product storage zone of the receptacle of claim 18;
   sealing a lid to the gas-barrier film at the sealing zone of the receptacle to enclose the product between the lid and the receptacle.

* * * * *